Figure 1:
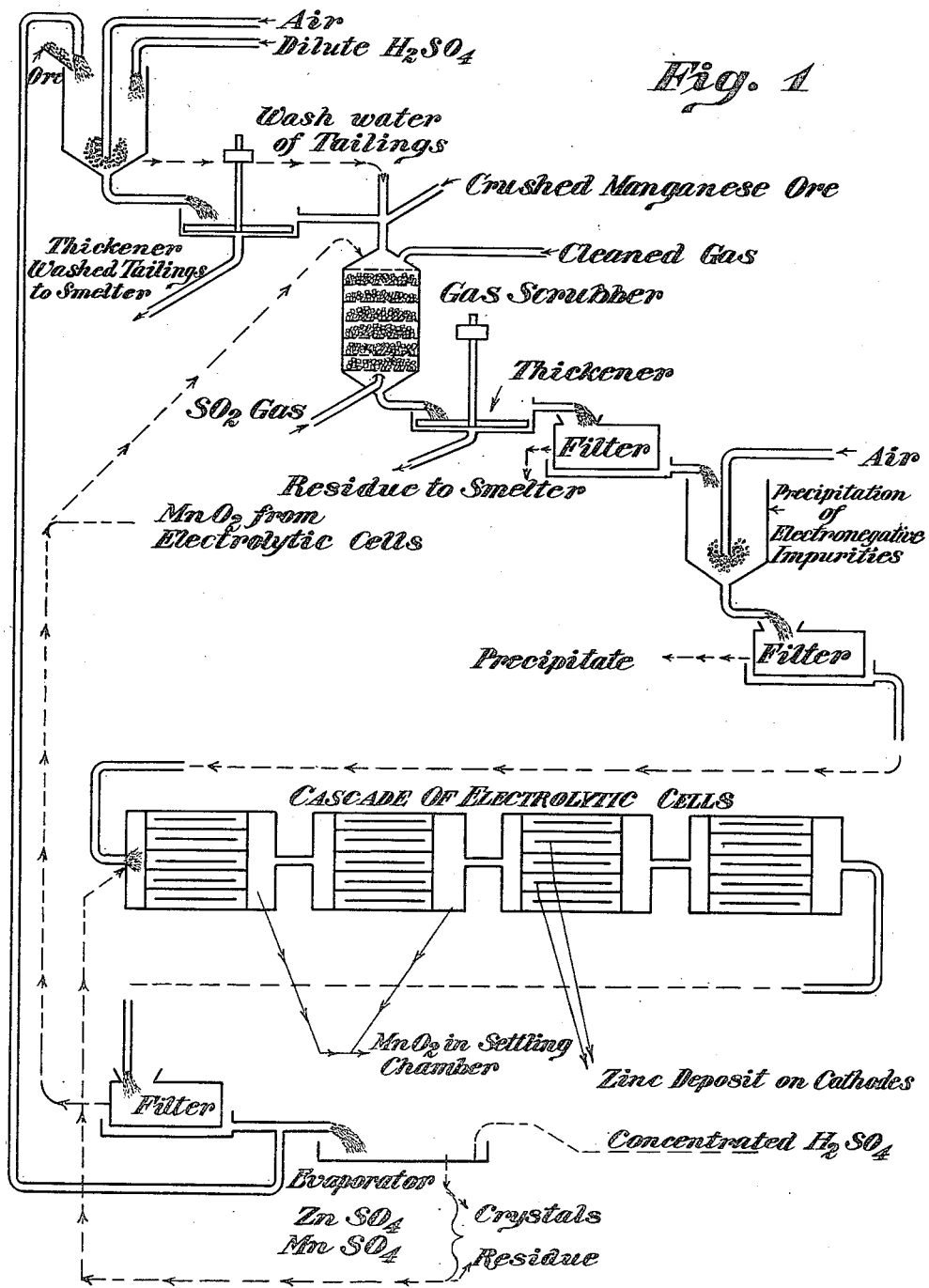

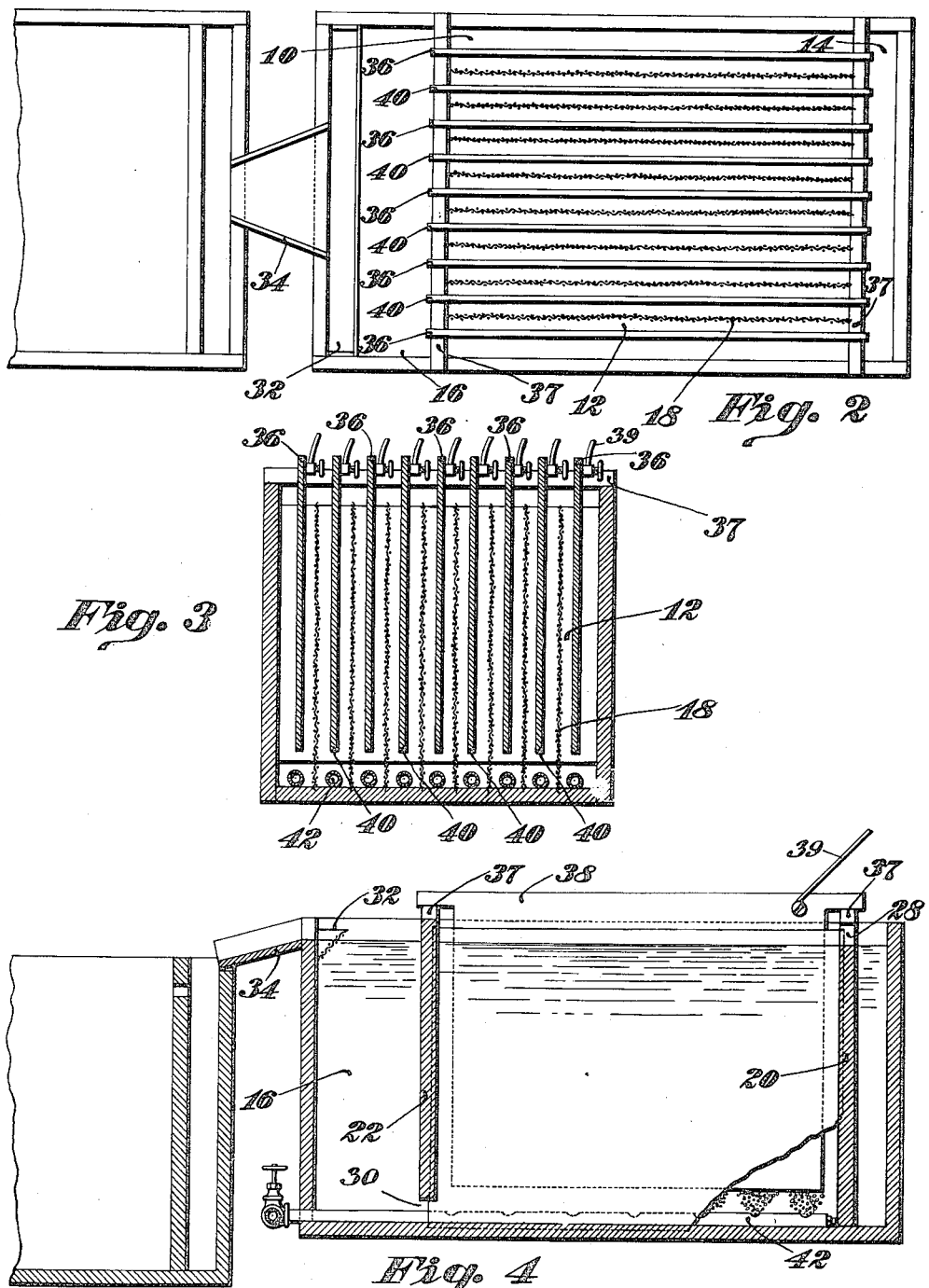

UNITED STATES PATENT OFFICE.

JOSEPH F. CULLEN, OF MIDVALE, UTAH, ASSIGNOR TO UNITED STATES SMELTING, REFINING & MINING COMPANY, A CORPORATION OF MAINE.

MANUFACTURE OF SULFURIC ACID.

1,278,308. Specification of Letters Patent. Patented Sept. 10, 1918.

Application filed September 13, 1917. Serial No. 191,104.

*To all whom it may concern:*

Be it known that I, JOSEPH F. CULLEN, a citizen of the United States, residing at Midvale, in the county of Salt Lake and State of Utah, have invented certain new and useful Improvements in the Manufacture of Sulfuric Acid; and I do hereby declare the following to be a full, clear, and exact description of the invention, such as will enable others skilled in the art to which it appertains to make and use the same.

This invention relates to the manufacture of sulfuric acid, and more particularly to the utilization of sulfur dioxid for the manuture of sulfuric acid in the treatment of manganese and zinc ores.

The object of the invention is to provide a novel and improved process for the treatment of ores containing manganese and zinc, or either of these metals, with furnace gases by which the sulfur dioxid of the gases is converted into sulfuric acid and the manganese and zinc are extracted from the ores.

The various features of the invention are illustrated in the accompanying drawings, in which Figure 1 is a diagrammatic view illustrating the steps in the process of treatment of zinc and manganese ores for the production of sulfuric acid, manganene dioxid and zinc. Fig. 2 is a top plan view of an electrolytic cell employed in the process; Fig. 3 is a vertical section of the cell; and Fig. 4 is a longitudinal vertical section of the same cell.

The process is particularly adapted for the treatment of sulfid zinc ores, since the sulfur dioxid formed in their roasting is finally converted into sulfuric acid which may be subsequently used in treating the roasted ores. The complete process as indicated diagrammatically in Fig. 1 may be outlined as follows: An oxidized zinc ore or a roasted zinc ore or concentrate in a fine state of division is leached with dilute sulfuric acid preferably in a Pachuca or similar tank provided with means for agitating the ore and acid. Zinc, copper, cadmium and a portion of the iron, arsenic and antimony in the ore are dissolved by the acid and the lead, gold, silver and a portion of the iron, arsenic and antimony remain in the leach residue. An excess of acid is used in the leaching and an acid pulp is discharged from the leaching tank into a thickener. The thickened pulp is filtered and washed and the residue sent to either the dump or a smelter according to its value. The wash water from the residue is added to the sulfate solution passing from the overflow of the thickener and the combined solutions are introduced at the top of a gas scrubber. Finally ground manganese ore enters the top of the scrubber together with the zinc sulfate solution and the latter carries the crushed ore down through the scrubber. Furnace gases containing sulfur dioxid are passed in at the bottom of the scrubber and flow upward in intimate contact with the descending pulp of manganese ore and sulfate solution. With proper control of the acidity of the sulfate solution with respect to zinc, lime and other acid consuming bases in the manganese ore and proper proportioning of manganese ore and sulfur dioxid gas, the solution leaving the scrubber is substantially neutral and contains the desired amounts of zinc and manganese. The sulfur dioxid is absorbed and oxidized by the manganese ore and the manganese converted into manganous sulfate. The gases leaving the scrubber contain little or no sulfur dioxid. The mixture of manganous and zinc sulfates, along with the residue of the manganese ore, are discharged from the scrubber into a thickener and the thickened pulp filtered and washed. It may be desirable to thicken and filter and pulp in a slightly acid instead of a neutral state. In this case the acid in the sulfate solution entering the top of the tower is proportioned to the amount of acid consuming bases in the manganese ore to permit the pulp to emerge acid from the base of the scrubber. The acid pulp is thickened and the thickened pulp filtered and washed. The combined thickener overflow and the filtrates are neutralized with powdered lime rock or lime in a Pachuca or other tank, filtered and the precipitate washed. This precipitate is either sent to the dump or returned to the process at the roasters according to its zinc content. The manganese ore residue is sent to the dump or to the smelter according to its value. The neutral solution of zinc and manganese sulfates is now practically free of iron, arsenic and antimony, but contains copper, cadmium and small amounts of other metals electronegative to zinc. These electronegative metals are precipitated by agitating the solution, preferably in a Pachuca tank, with finely divided metallic zinc. The resulting solution is settled, decanted, filtered and sent to the electrolytic cells. In the electrolysis zinc is deposited on the cathodes and manganese dioxids and sulfuric acid are produced at the anode. After the electrolysis the electrolyte containing small amounts of zinc and manganese sulfates is returned to the leaching tank for treating new ore. The excess of acid over the requirement of the process is recovered for the market in concentrated form by evaporating. Zinc and manganese sulfate crystals deposited in the concentration of the spent electrolyte are returned to the strong electrolyte in the cells. The manganese dioxid produced in the cells is practically pure, and if the same manganese ore does not furnish enough manganese to support the process, a portion of the manganese dioxid may be returned to the top of the gas scrubber to absorb new volumes of sulfur dioxid. The excess manganese dioxid may be used in the manufacture of dry batteries, chlorin or ferro manganese. The zinc deposited on the cathodes is practically pure and may be returned to the process to produce new volumes of zinc sulfate solution or, in case the ore contains sufficient zinc, the deposited zinc may be used for market purposes.

Th manganese ore which is used in the gas scrubber for oxidizing sulfur dioxid must contain manganese which is in a state of oxidation higher than the manganous in order to successfully react with the sulfur dioxid gas. The products of the reaction of the sulfur dioxid with the manganese ore are manganous sulfate and water which are formed according to the following formula:

$$SO_2 + H_2O + MnO_2 = MnSO_4 + H_2O$$

The gas which enters the gas scrubber is taken from the furnace flue and is hot and therefore produces a distinct evaporation and concentration of the solution while passing through the scrubber. Further, the dust and metallic values in the gas are removed by the sulfate solutions so that the gas emerging from the gas scrubber is substantially clean and may be discharged into the atmosphere and not be injurious to plant and animal life. Any iron and arsenic which are present in the sulfate solution in a lower state of oxidation are oxidized by the manganese dioxid of the ore so that they are readily removed when the solution is neutralized.

A type of electrolytic cell which may be used in electrolyzing the sulfate solutions is illustrated in Figs. 2, 3 and 4. This cell comprises anode compartments 10, cathode compartments 12, an overflow chamber 14 at one end of the electrode compartments, and settling chamber 16 for the manganese dioxid at the other end of the electrode compartments. Anode and cathode compartments are separated by porous diaphragms 18 consisting of woolen, asbestos or other cloth which serve to separate anode functions and products from cathode functions and products, but permit a flow of electric current between the electrodes. The overflow and settling chambers are separated from the electrode compartments by partitions 20 and 22 respectively. The solution enters the overflow chamber 14, flows through openings 28 (Fig. 4) near the top of the partition 20, passes through the anode and cathode compartments and through openings 30 at the bottom of the partition 22 into the settling chamber 16. From the settling chamber the solution passes through filters 32 into trough 34, from which the solution enters the overflow compartment of the succeeding cell. The anodes 36 consist of lead plates which are located at substantially the center of the anode compartments. The plates are supported by lugs 38, formed at opposite ends of the side of the plates, which rest on insulating rods 37. The cathodes 40 consist of aluminum plates which are located at substantially the center of the cathode compartments and are similarly suspended from lugs 38. The anodes and cathodes are provided with electrical connections 39 by which they may be connected with the power boss-bars. To assist the migration of the ions of the electrolyte to the electrodes, air pipes 42 are located in the bottoms of the anode and cathode compartments by which the solution may be actively agitated.

The electrolytes from the anode and cathode compartments mix in the settling chamber before they pass to the overflow chamber of the succeeding cell. The filter 32 prevents the escape of suspended manganese dioxid into the succeeding cell so that the manganese dioxid will not enter the cathode compartments of the succeeding cell. The diaphragms 18 act merely to separate the anode and cathode functions and products in the vicinity of flow of the electric current.

The solution of zinc and manganous sulfate prepared for electrolysis contains these salts in substantially molecular proportions. The sulfate solution is broken up by the electrolysis according to the following formula:

$$ZnSO_4 + MnSO_4 + 2H_2O = \frac{\text{cathode}}{Zn} + \frac{\text{anode}}{MnO_2 + 2H_2SO_4}$$

Zinc is deposited on the cathodes and in the anode compartments sulfuric acid is set free and manganous sulfate is oxidized by the anodic oxygen forming manganese dioxid. Under the existing conditions manganese dioxid is apparently produced in accordance with the following formula:

$$MnSO_4 + H_2O + O = MnO_2 + H_2SO_4$$

Since an acid solution of manganous sulfate is not substantially affected by oxygen in the molecular state, the lead anode in effect acts as a catalyzer in oxidizing the manganous sulfate to manganese dioxid. The anodic oxidation does not proceed substantially above the order of manganese dioxid until the concentration of manganous sulfate in the electrolyte becomes very low, whereupon a small amount of permanganic acid is formed. The manganese dioxid is deposited on the anode as a loose black or brown precipitate, and the agitation of the electrolyte sweeps it away from the electrode and it is carried out by the flow of electrolyte into the settling chamber of the cells from which it may be removed periodically.

In the usual electrolytic production of zinc, a pure solution of zinc sulfate is electrolyzed according to the following formula:

$$ZnSO_4 + H_2O = \frac{\text{cathode}}{Zn} + \frac{\text{anode}}{H_2SO_4 + O} - 106{,}800 \text{ calories (approximately)}$$

In this reaction the anodic oxygen is lost. When the zinc-manganous sulfate solution is electrolyzed according to the following formula:

$$ZnSO_4 + MnSO_4 + 2H_2O = \frac{\text{cathode}}{Zn} + \frac{\text{anode}}{MnO_2 + 2H_2SO_4} - 103{,}500 \text{ calories (approximately)}$$

about 3% less energy is consumed in depositing a molecule of zinc, a molecule of manganese dioxid, and two molecules of sulfuric acid, than is consumed in the electrolysis of pure zinc sulfate solutions to deposit a molecule of zinc and produce one molecule of sulfuric acid. In the zinc-manganous sulfate electrolysis the deposition of zinc and the production of sulfuric acid and manganese dioxid are substantially quantitative, and all the components entering the reaction are recovered in valuable products.

During the electrolysis the sulfuric acid that has been spent in dissolving zinc from the ore is regenerated and the sulfur dioxid which enters the process is converted to sulfuric acid. A portion of the sulfuric acid produced from the sulfur dioxid will be returned for treating new zinc ore, because of leakage and other losses, but the major portion will be recovered as a commercial acid for the market. If it is desired to treat only a manganese ore and the ore does not carry sufficient zinc to maintain a molecular proportion of zinc in the solution entering the electrolytic cells, the zinc deposited on the cathodes may be returned to the process for the treatment of new lots of manganese ore. On the other hand, if it is desired to treat only a zinc ore which does not contain sufficient manganese dioxid to maintain molecular proportions of manganese in the solution entering the electrolytic cells, the portion of manganese dioxid recovered by the electrolysis may be returned to the gas scrubbers.

The preferred form of the invention having been thus described, what is claimed as new is:

1. The process of making sulfuric acid, comprising reducing manganese ore with sulfur dioxid in the presence of a zinc sulfate solution purifying the resultant solution, and electrolyzing in a cell having an insoluble anode to oxidize the manganese.

2. A process for recovery of sulfuric acid, manganese dioxid and zinc, comprising reducing manganese dioxid with sulfur dioxid in the presence of a zinc sulfate solution; purifying the resultant solution; electrolyzing with an insoluble anode to oxidize manganese and produce sulfuric acid at the anode; and recovering zinc at the cathode.

3. A process of making sulfuric acid, comprising treating a solution of zinc sulfate with manganese dioxid and sulfur dioxid, purifying the resultant solution, electrolyzing the resultant solution between an insoluble anode and a metallic cathode, and filtering the electrolyte to recover manganese dioxid and sulfuric acid.

4. A cyclical process of making sulfuric acid, comprising reducing an oxid of manganese in a state of oxidation higher than the manganous by means of sulfur dioxid and water, adding a zinc sulfate solution, electrolyzing the resultant zinc-manganese sulfate solution to oxidize the manganese and form sulfuric acid, and returning the oxidized manganese product to oxidize new volumes of sulfur dioxid.

5. A cyclical process of making sulfuric acid, comprising dissolving a zinc ore in sulfuric acid, adding manganese ore containing manganese in a higher state of oxidation than the manganous, scrubbing sulfur dioxid with the zinc sulfate solution-manganese ore mixture, purifying the scrubber solution and electrolyzing the solution using an insoluble electrode to produce manganese dioxid and sulfuric acid at the anode, and returning a portion of the manganese dioxid and sulfuric acid to treat new ore.

6. In the process of making sulfuric acid, that step which comprises electrolyzing with an insoluble anode a solution containing a molecular proportion of manganese sulfate and zinc sulfate, depositing the zinc at the cathode, and controlling the oxidation at the anode to produce sulfuric acid and manganese dioxid.

7. In the process of making sulfuric acid, that step which comprises electrolyzing with an insoluble anode a solution containing sulfates of zinc and manganese in approximately molecular proportions, depositing zinc on the cathode, and producing manganese dioxid at the anode.

8. In the process of making sulfuric acid, that step which comprises electrolyzing with an insoluble anode a solution containing sulfates of manganese and zinc, and isolating during the electrolysis the anode functions and products from the cathode functions and products.

9. In the process of making sulfuric acid, that step which comprises electrolyzing with an insoluble anode a solution containing sulfates of zinc and manganese in their molecular proportions, isolating during the electrolysis the anode functions and products from the cathode functions and products, and separately agitating the solutions in the anode and cathode compartments.

10. In the process of making sulfuric acid, that step which comprises electrolyzing a solution of sulfates of zinc and manganese with an insoluble anode, and controlling the constitution of the solution to insure a sufficient proportion of manganous sulfate to be oxidized by the anodic oxygen so that oxidation does not progress substantially farther than the manganic state.

11. In the process of making sulfuric acid, that step which comprises electrolyzing a solution containing zinc and manganese sulfates in substantially molecular proportions, and using an insoluble anode having a catalytic action to produce an anodic oxidation of manganous sulfate to manganese dioxid.

12. In the process of making sulfuric acid, that step which comprises electrolyzing with an insoluble anode a solution containing zinc sulfate and manganous sulfate in their molecular proportions, depositing zinc at the cathode, and producing sulfuric acid and oxidizing the manganous sulfate at the anode.

JOSEPH F. CULLEN.